Sept. 18, 1956  E. H. CARRUTHERS  2,763,114
METHOD OF HARVESTING AND SEPARATING POD TYPE VEGETABLES
Filed April 14, 1954  10 Sheets-Sheet 1

INVENTOR.
EBEN H. CARRUTHERS
BY

Sept. 18, 1956 E. H. CARRUTHERS 2,763,114
METHOD OF HARVESTING AND SEPARATING POD TYPE VEGETABLES
Filed April 14, 1954 10 Sheets-Sheet 2

INVENTOR.
EBEN H. CARRUTHERS
BY

Sept. 18, 1956    E. H. CARRUTHERS    2,763,114
METHOD OF HARVESTING AND SEPARATING POD-TYPE VEGETABLES
Filed April 14, 1954    10 Sheets-Sheet 3
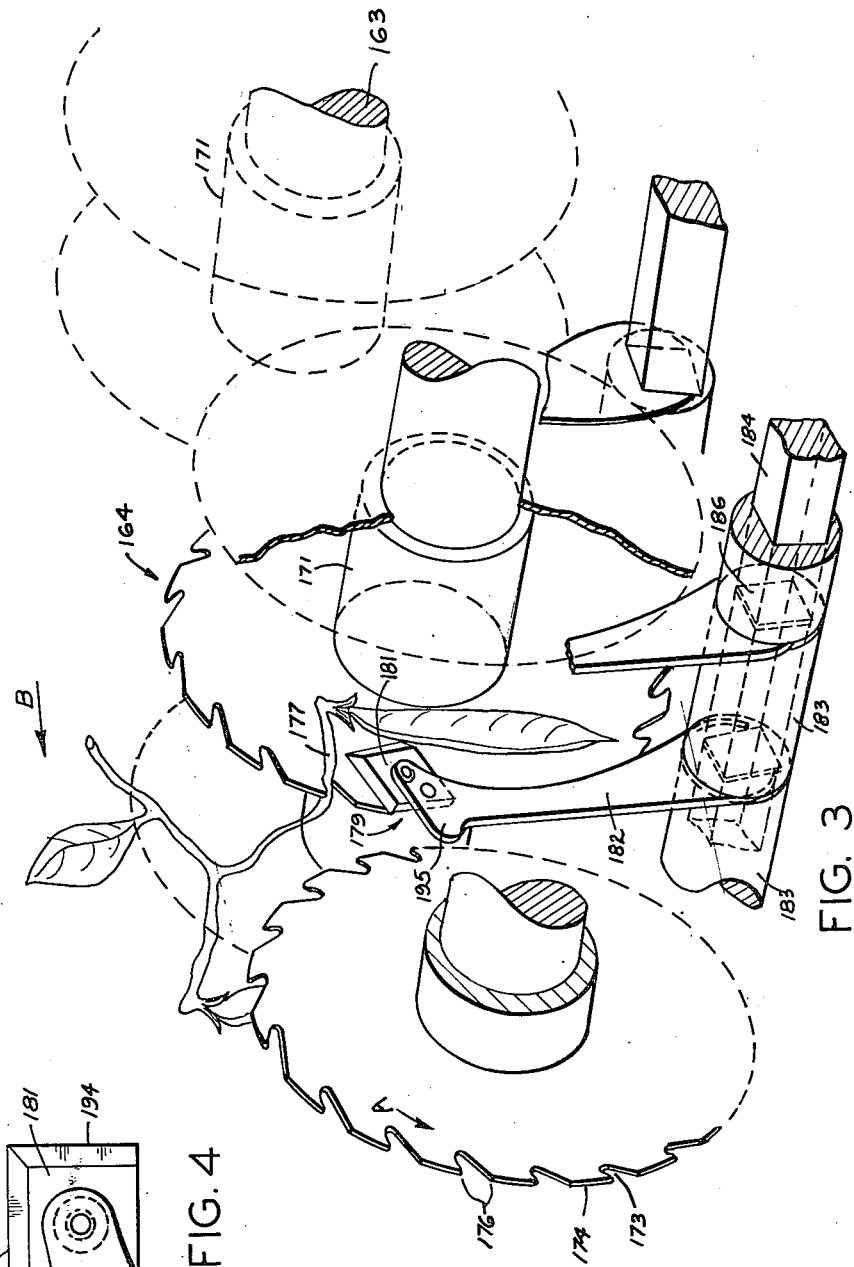
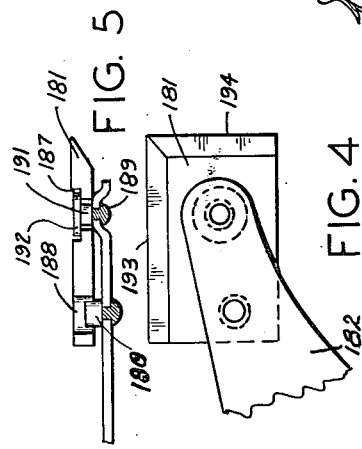
INVENTOR.
EBEN H. CARRUTHERS
BY

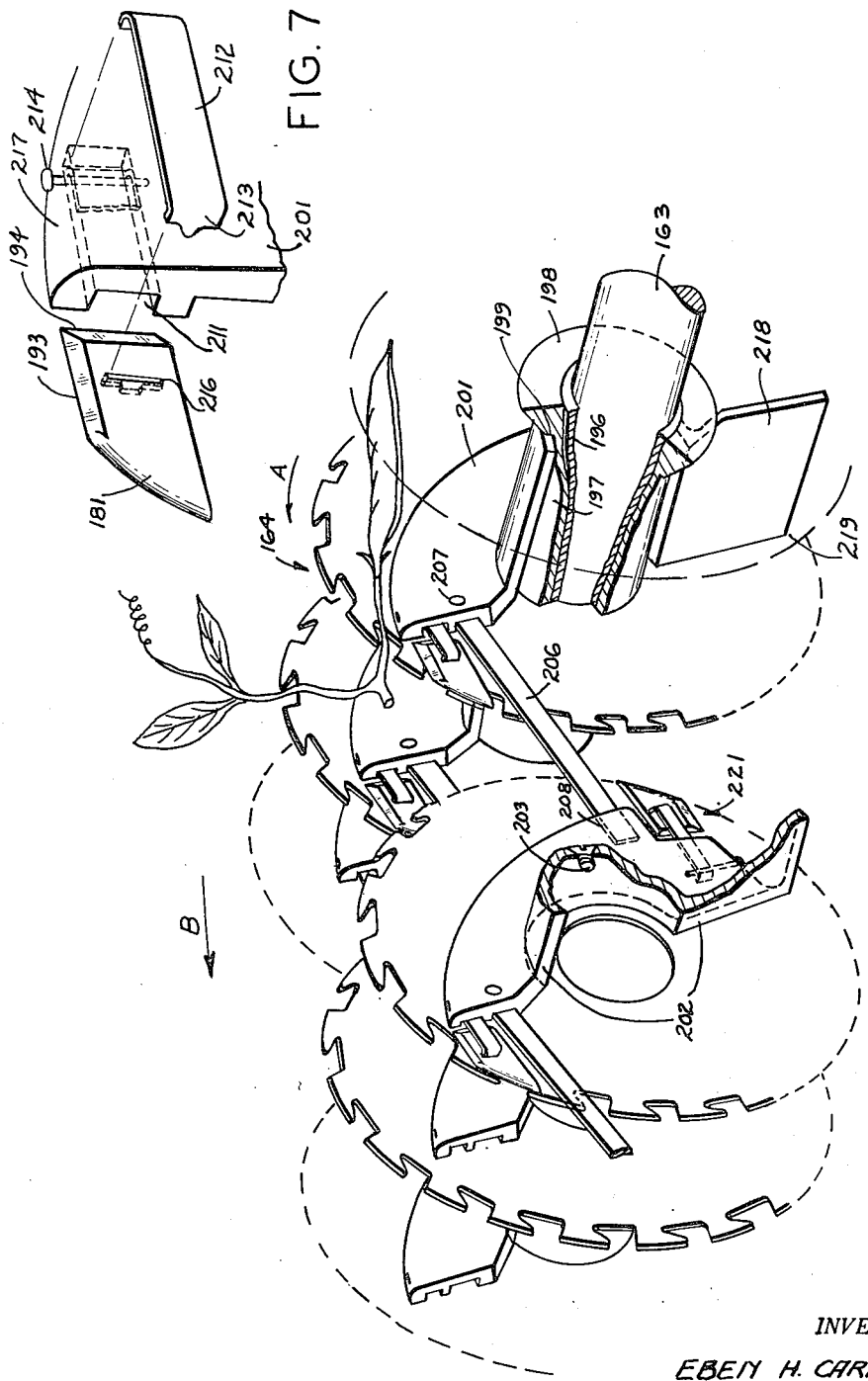

Sept. 18, 1956 E. H. CARRUTHERS 2,763,114
METHOD OF HARVESTING AND SEPARATING POD TYPE VEGETABLES
Filed April 14, 1954 10 Sheets-Sheet 5

INVENTOR.
EBEN H. CARRUTHERS
BY

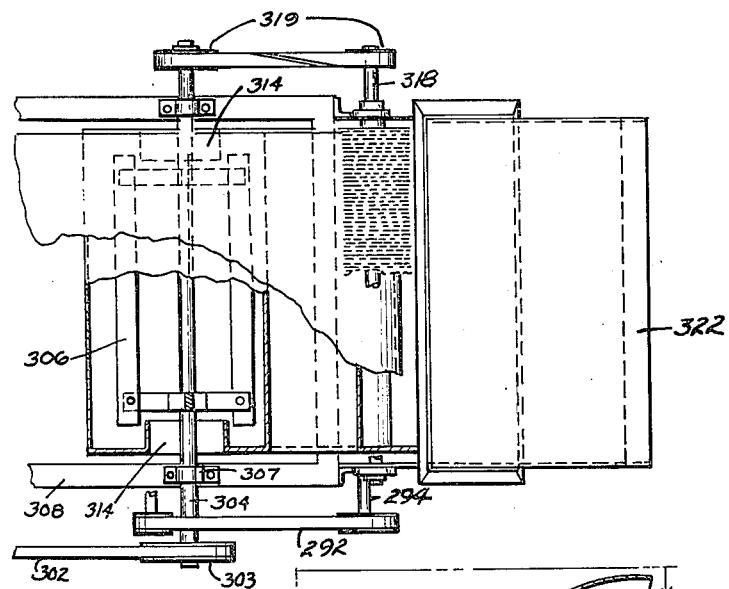
FIG. 11
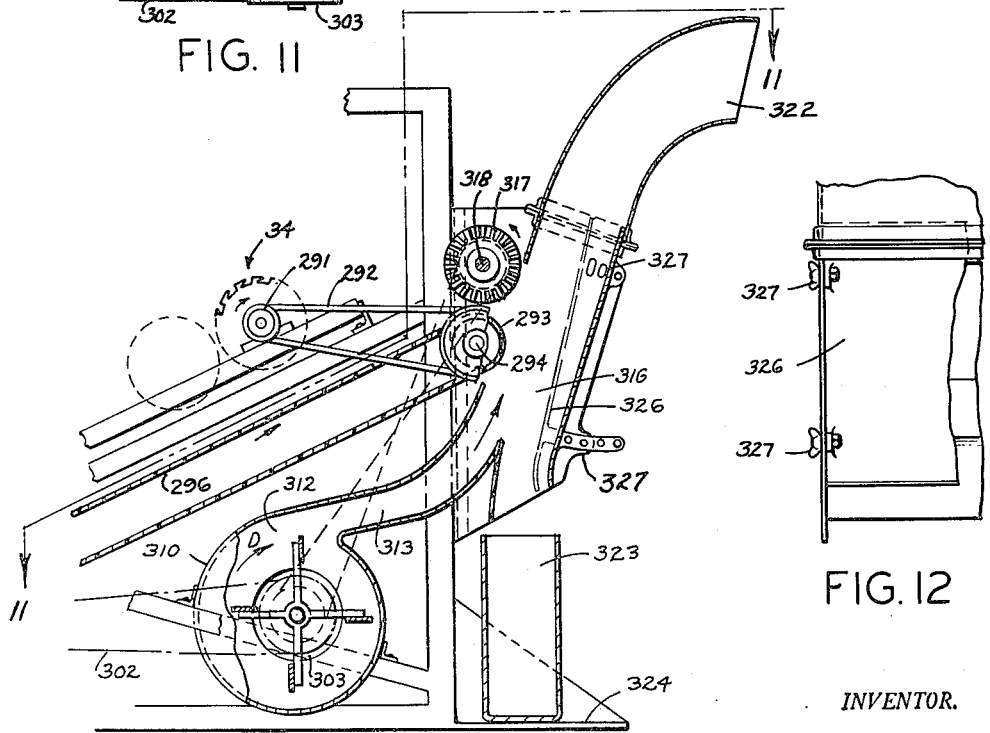
FIG. 10
FIG. 12
INVENTOR.
EBEN H. CARRUTHERS

Sept. 18, 1956    E. H. CARRUTHERS    2,763,114
METHOD OF HARVESTING AND SEPARATING POD TYPE VEGETABLES
Filed April 14, 1954    10 Sheets-Sheet 7

INVENTOR.
EBEN H. CARRUTHERS
BY

Sept. 18, 1956 E. H. CARRUTHERS 2,763,114
METHOD OF HARVESTING AND SEPARATING POD TYPE VEGETABLES
Filed April 14, 1954 10 Sheets-Sheet 8
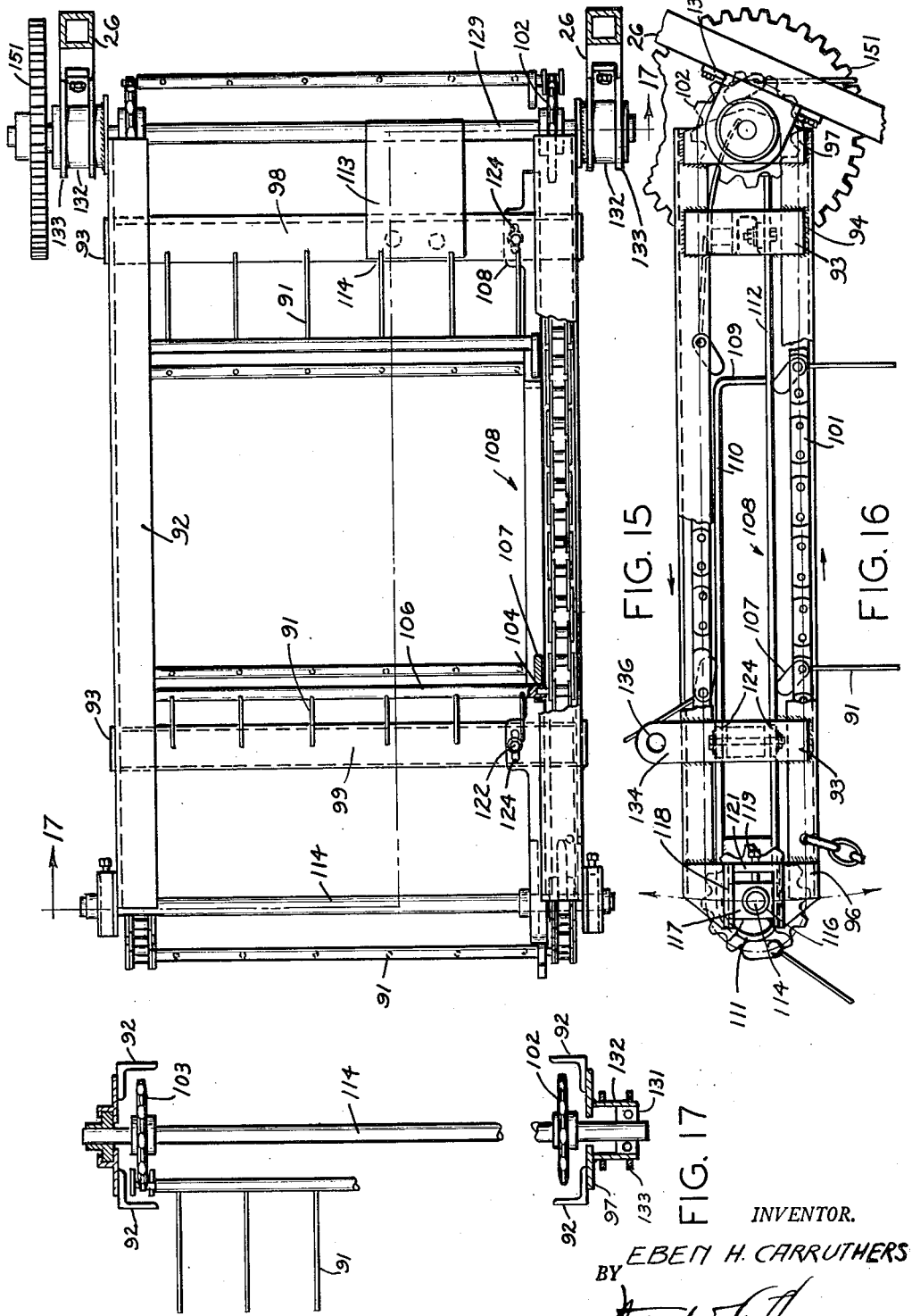
INVENTOR.
EBEN H. CARRUTHERS
BY Sept. 18, 1956  E. H. CARRUTHERS  2,763,114
METHOD OF HARVESTING AND SEPARATING POD TYPE VEGETABLES
Filed April 14, 1954  10 Sheets-Sheet 9
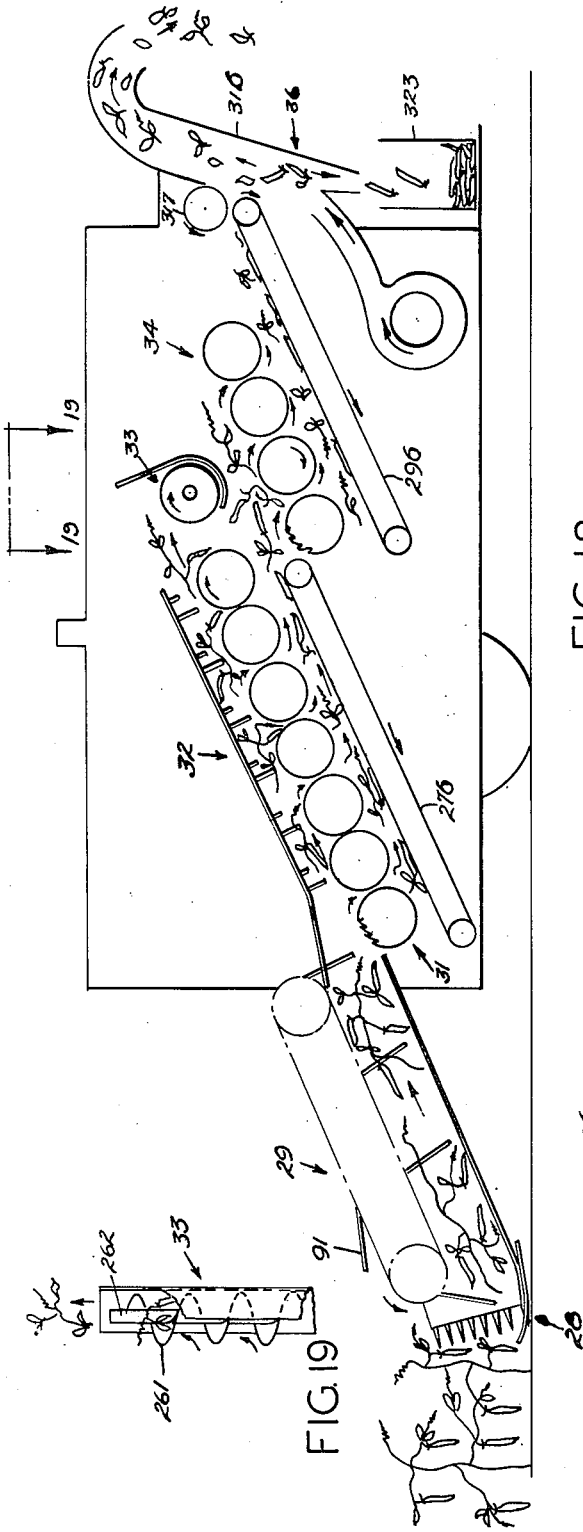
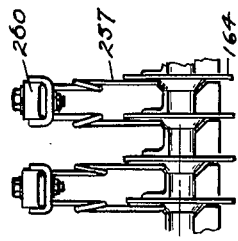
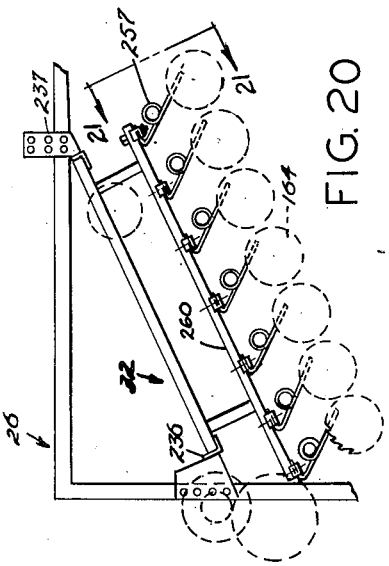
INVENTOR.
EBEN H. CARRUTHERS
BY Sept. 18, 1956   E. H. CARRUTHERS   2,763,114
METHOD OF HARVESTING AND SEPARATING POD TYPE VEGETABLES
Filed April 14, 1954   10 Sheets-Sheet 10

INVENTOR.
EBEN H. CARRUTHERS
BY

United States Patent Office 2,763,114
Patented Sept. 18, 1956

2,763,114
METHOD OF HARVESTING AND SEPARATING POD TYPE VEGETABLES

Eben H. Carruthers, Warrenton, Oreg.

Application April 14, 1954, Serial No. 423,136

24 Claims. (Cl. 56—1)

My invention relates to a method of harvesting pod type vegetables, cutting and separating the pods from the vines and leaves and the complete method includes the procedure for preparing the vegetable for canning or freezing.

The method of my invention has been particularly developed for use in the harvesting and preparation of peas for market. However, at least most of the principles of my invention are adapted to the harvesting and preparation of other pod type vegetables for canning or freezing such as green beans, wax beans, lima beans, okra, soya beans, etc. While the invention will be described in connection with the harvesting of peas, it will be understood that the invention has broader application and most of the steps of the method of my invention has application in the harvesting and preparation for market of other types of pod type vegetables such as enumerated above.

One of the present practices in harvesting peas is to sever the complete vine including leaves and pods at a point near the ground and transport the entire mass to the canning or freezing plant for removal of the peas from the pods and otherwise preparing the peas for canning or freezing. This method has distinct disadvantages. Usually the canning or freezing plant is located a long distance from the fields in which the peas are grown. The necessity of transporting a large bulk of material and the return of an almost equally large bulk of material to the farm for use as fertilizer or ensilage involves a substantial element of cost of the product to the consumer. Moreover, the canning or freezing plant must be geared in production facilities to the packing of large quantities of peas in a short time interval as will be more fully explained later.

The costs involved in the above set forth method necessitating the transportation of large bulks of material over long distances have led to the development of machinery usually placed in a fixed location in the fields to remove the peas from the pods. Thus the present practice in the harvesting of peas by large growers thereof is to mow or otherwise cut the vines including the leaves and pods from the stems and then feed the vines, leaves and pods to a machine which separates the peas from the pods, leaves and vines. This operation is one of beating the mass of material with such force that the pods or casings for the peas are broken and the peas beaten from the pods. The beating action results not only in bruised and broken peas but also the exposure of the peas to air immediately starts a deteriorating action which adversely affects the product when either canned or frozen. Moreover, the peas may be in the fields and subject to heat and dust for as much as half a day before being trucked to the cannery or freezing plant. Not only are the peas subject to the deleterious action of the elements but also prior to canning or freezing the more battered or broken peas must be separated from the undamaged or only partly damaged peas. The result is added cost of the product to the consumer and an inferior product.

An object of my invention is to provide a method of harvesting peas and other pod type vegetables in which the peas are protected at all steps of the method from exposure to the sun, dust and air until just prior to being placed in a can or freezing container.

Another object of my invention is to provide a method of harvesting pod type vegetables which includes the steps of cutting the vines, leaves and pods from the stems of growing plants, cutting the vines and leaves from the pods and separating the pods from the leaves and vines, such steps being accomplished in the fields of growing vegetables and on a moving conveyance such as a tractor drawn machine to the end that the operation of obtaining pods with the peas therein substantially free of vines and leaves may be carried out in a substantialy continuous economical manner.

Another object of my invention is to provide a method of harvesting peas, the result of which is to enable the convenient spreading of the stems and leaves back on the land in a finely divided condition or their recovery for ensilage purposes and the transportation of pods substantially free of leaves and vines to the canning or freezing plant to avoid the necessity of transporting a large bulk of material to the canning or freezing plant while at the same time protecting the peas against the deleterious effects of atmospheric conditions and the exposure of the peas to the sun and dust.

A further object of my invention is to provide a method which may be carried out by a machine which may be drawn through the fields of growing peas to harvest the peas, cut the vines and leaves from the pods and separate the pods from the leaves and vines to the end that a substantially continuous operation may be carried out in the fields which results in enabling within a minimum of time after harvesting the transportation of the pods with the peas therein substantially free of vines and leaves to the canning or freezing plant for further processing.

A further object of my invention is to provide a method in which a machine may be drawn through the fields of growing plants to harvest the peas; feed the vines, leaves and pods to a cutter bed or series of cutter beds to cut the vines and leaves from the pods by a shearing action; separate the pods from the leaves and vines whereby the leaves and vines may, in a finely divided condition, be respread over the fields and the pods with the peas therein are undamaged by any violent beating action or exposure to the elements; the pods immediately thereafter being transported to the cannery or freezing plant for either prompt removal of the peas from the pods and the freezing or canning of the peas or the storage of the pods with the peas therein at either freezing temperatures or controlled temperature and humidity conditions for later removal of the peas from the pods whereby a more constant production flow of peas through the plant for canning and freezing over a longer period of time may be accomplished.

My invention further contemplates a complete method of harvesting peas and preparing them for market with the objects of insuring the canning or freezing the peas in a "fresh" state; enabling the orderly and efficient operation of a canning or freezing plant over a longer period of time than the relatively short pea harvesting season; permitting the use of a smaller work force over a longer period of time to the end that the workers may be more adequately trained in their work duties; and enabling a reduction in the cost of preparing peas for market.

Other objects and advantages of my invention will be particularly set forth in the claims and will be apparent from the following description, when taken in connection with the accompanying drawings, in which:

Fig. 3 is an enlarged perspective view partly in section of a portion of the vine cutting bed or bank of cutters with parts being broken away better to illustrate this part of the invention;

Fig. 4 is an enlarged view of one of the stationary cutter knives or blades;

Fig. 5 is a top plan view partly in section of Fig. 4 showing how the cutter blade of Fig. 4 is flexibly mounted;

Fig. 6 is a view partly in section similar to Fig. 3 showing an alternate and perhaps preferred form of stationary and rotatable cutters and particularly showing a mounting of the stationary cutters designed to reduce the tangling or massing of the vines;

Fig. 7 is a perspective exploded view illustrating how the stationary cutter blades of Fig. 6 are flexibly mounted;

Fig. 10 is a side elevation enlarged and partly in section of the means employed for separating the pods from the vines and leaves;

Fig. 11 is a view partly in section taken substantially on the line 11—11 of Fig. 10 in the direction indicated by the arrows parts of the machine being broken away more clearly to illustrate the invention;

Fig. 12 is an enlarged view showing the means for regulating or controlling the air flow for separation of vines and leaves from the pods;

Fig. 15 is an enlarged top plan view partly in section and with parts broken away of the conveyor system or movable rake fingers for carrying the vines, leaves and pods cut from the growing field of peas by the sickle bar to the upper cutter bed or bank of cutters;

Fig. 16 is a side elevation of Fig. 15 with parts broken away better to illustrate the invention;

Fig. 17 is a view partly in section taken substantially on the line 17—17 of Fig. 15, that is, a view illustrating one driving sprocket for the conveyor or movable rake fingers of Figs. 15 and 16 and one driven sprocket;

Fig. 18 is an elevational view largely diagrammatic showing the flow of vines, leaves and pods through the machine;

Fig. 19 is a view on a reduced scale taken substantially on the line 19—19 of Fig. 18 in the direction indicated by the arrows and showing the helical transversely extending conveyor for discharging excess vines with pods thereon from the machine to be picked up again by the machine when the machine makes its next swath through the field;

Fig. 20 shows on a reduced scale an alternate form of stationary rake fingers which may be employed instead of the movable rake fingers shown in Figs. 1 and 14;

Fig. 21 is an enlarged view taken substantially on the line 21—21 of Fig. 20 in the direction indicated by the arrows showing a detail of one of the stationary rake fingers.

As previously mentioned, the method of my invention has primarily been developed in connection with the harvesting of peas, the complete method including all of the steps involved substantially until the peas are ready to be placed in cans or containers for freezing. However, adaptations of the principles of my machine and at least portions if not the whole of the complete method are adapted to the harvesting and preparing for market of green beans, wax beans, lima beans, okra, soya beans, and other pod type vegetables.

Figure 1:
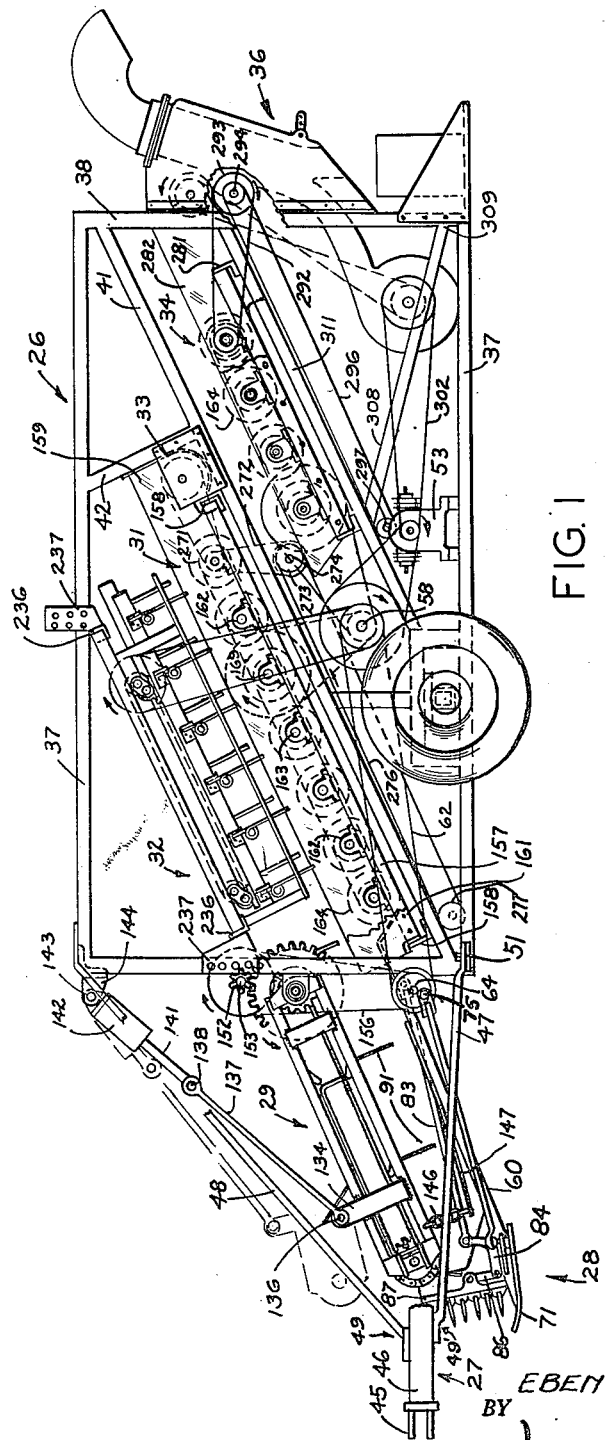
Fig. 1 is a side elevation of the machine for carrying out most of the steps of the method of my invention, some parts thereof being shown in dotted lines some parts broken away and other parts being somewhat diagrammatically shown for the purpose of more clearly illustrating the invention.
Figure 13:
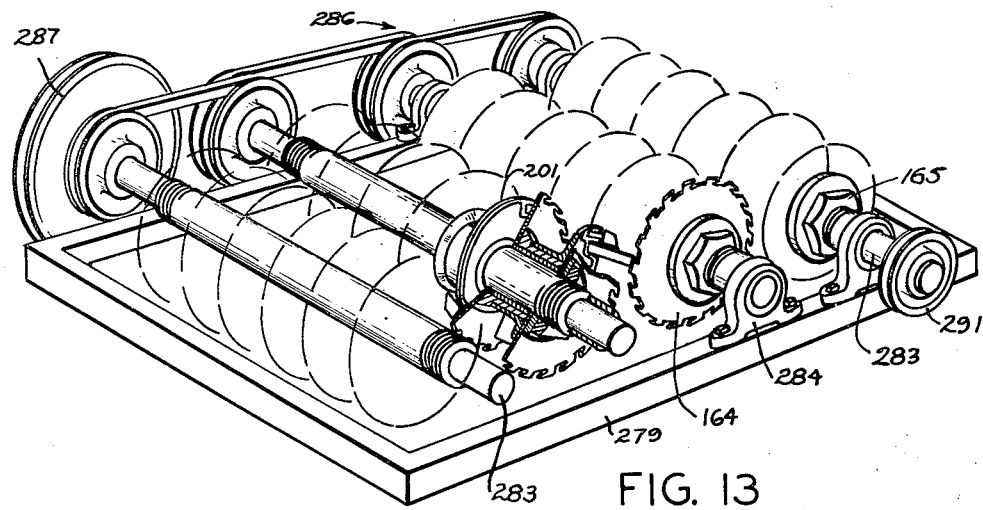
Fig. 13 is a perspective view on a larger scale than Fig. 1 and smaller scale than Fig. 3 partially diagrammatic and with parts broken away and partly in section showing the lower cutter bed or bank of cutters, the view however being illustrative of the upper cutter bed and also showing the stationary and rotatable cutters illustrated in Figs. 6 and 7.
Figure 14:
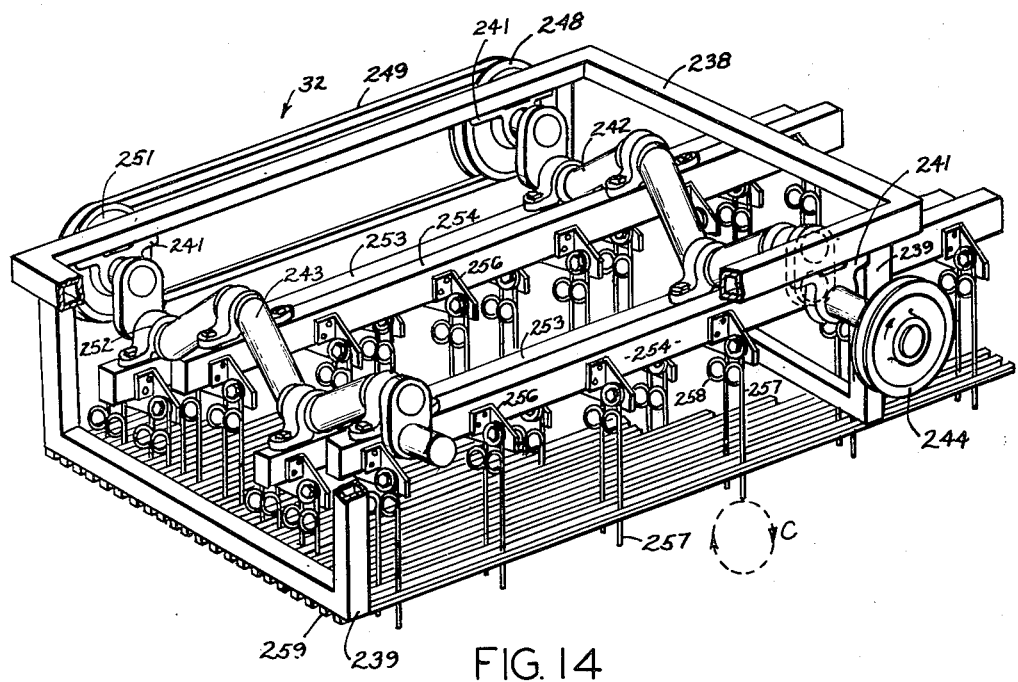
Fig. 14 is a perspective view on an enlarged scale showing the movable rake fingers illustrated in Fig. 1.

Referring to Fig. 1, the machine by which most of the steps of the methods are carried out, comprises a main frame generally indicated by the numeral 26; a draw bar generally indicated by the numeral 27 connected to the main frame 26; a sickle bar assembly generally indicated by the numeral 28 located at the forward end of the machine; a conveyor unit generally indicated by the numeral 29, the details of which are shown in Figs. 15 to 17 inclusive; a primary cutter bed or bank of cutter blades 31, the details of various alternate forms of which are shown in Figs. 3 to 9 inclusive; a rake finger assembly or conveyor generally indicated by the numeral 32, the details of which are shown in Fig. 14 and an alternate form of which is shown in Figs. 20 and 21; a helical conveyor generally indicated by the numeral 33, the details of which are shown in Fig. 19, and which is adapted to discharge excess vines, leaves and pods from the machine; a secondary cutter bed or bank of cutter knives generally indicated by the numeral 34 shown in detail in Fig. 13; and a separation unit generally indicated by the numeral 36 adapted to separate the pods from the leaves and vines to the end that the pods may be transported to the canning or freezing plant for further processing in accordance with the method of my invention and the vines and leaves in a finely divided condition may either be spread back upon the land or used as ensilage.

Figure 2:
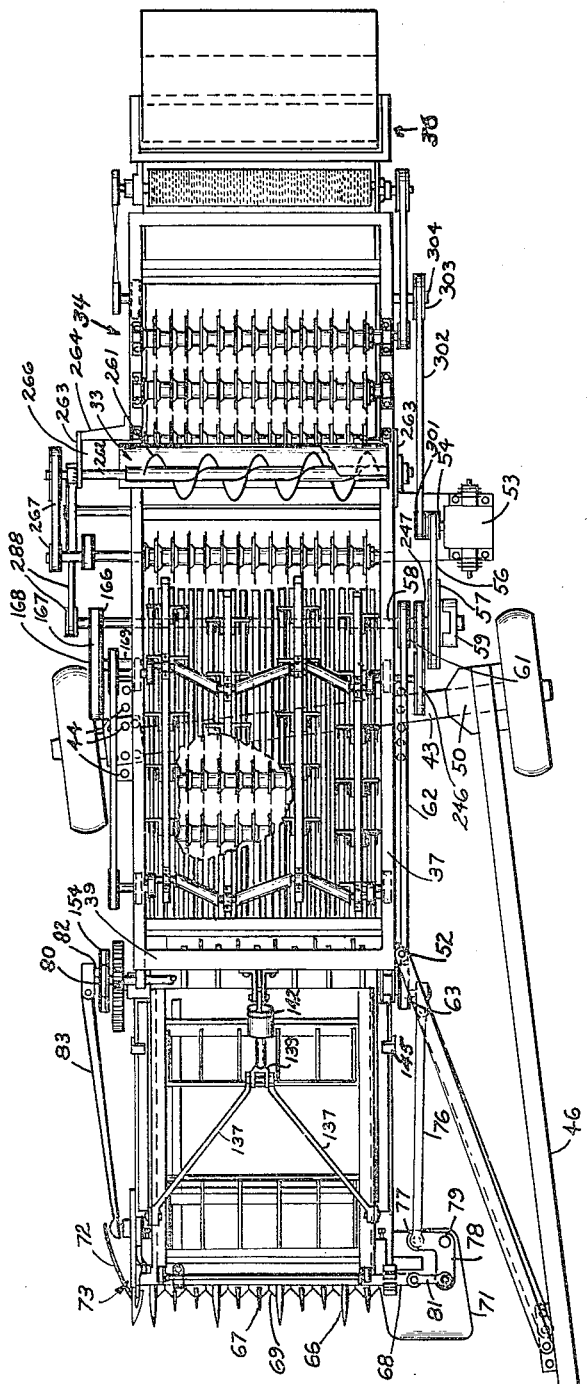
Fig. 2 is a top plan view of the machine of Fig. 1 with parts broken away to illustrate the invention more clearly.

As shown most clearly in Figs. 1 and 2, the main frame generally indicated by the numeral 26, comprises top and bottom main frame bars 37 connected by vertical bars 38 and horizontal transverse bars 39 at the top and bottom and each end of the frame. Further to provide a rigid frame, diagonal structural elements 41 are rigidly connected to and extend from the front to the back of the frame and are tied to the top bars 37 by short angularly extending structural elements 42. The entire assembly of structural shapes forming the main frame are welded or otherwise rigidly secured together as an integral unit for purposes of strength. All sub frames as will presently appear are removable separately from the main frame for separate cleaning, adjustment or repair. The advantage of the rigid frame structure with separate removable units is that with a rigid frame adapted to resist twisting and other stresses, the several operating units generally mentioned above can be built without the necessity of having to resist twisting and other stresses in and of themselves.

The axle 43 of the machine is rigidly supported from the main frame of the machine but is adjustably bolted thereto as indicated at 44. The drawbar comprises a square tubular member 46 provided at the forward end with a suitable hitch 45 and adjustably bolted to the axle 43 at 50. A pair of drawbar stiffening links 47 and 48 are pivotally attached at 49 and 49¹. The link 47 extends rearwardly and is pivoted to the main frame at 51 at the lower forward corner thereof while the drawbar link 48 extends to the top of the frame (Fig. 2) and is pivoted at 52 to the main frame. The entire drawbar unit as will be observed from an examination of Fig. 2, lies to one side of the machine. The entire machine may thus be drawn at a slight angle with respect to the direction of travel. This arrangement eliminates the necessity of placing one wheel under the machine to keep it out of the uncut vines which would unbalance the machine. The arrangement of wheels and drawbar permits the tractor to move through the previously cut swath while the wheels of the machine follow the swath being currently cut.

All movable parts carried by or mounted upon the machine are driven from a gasoline engine or any other suitable prime mover 53 (Fig. 1). The engine shaft carries a pulley 54 from which all driven parts at the forward end of the machine are driven. In the drawings, for simplicity I have shown all drives as comprising pulleys and belts and the drives for various driven elements will be thus described except where chains or gears are necessary. However, it will be understood that chains and sprockets may be substituted where desired. The pulley 54 carries a belt 56 which extends over a pulley 57 loose with respect to a main shaft 58. By means of a manually operated clutch 59 the pulley 57 may be connected and disconnected from the main shaft 58. The purpose of the clutch is to disconnect all driven mechanisms which apply any appreciable load on the engine to facilitate starting of the engine.

Considering first the sickle bar assembly generally indicated by the numeral 28, it includes structural elements 60 forming a supporting frame. The main shaft carries a pulley 61 (Fig. 2) over which a belt 62 passes. This belt passes over a pulley 63 rigid with a shaft 64 (Fig. 1). The knives of the sickle bar assembly and the conveyor unit, generally indicated by the numeral 29, are driven from the shaft 64.

The sickle bar assembly is a conventional unit employed in connection with a number of different types of harvesting and cutting machines and therefore does not per se constitute part of my invention except insofar as it enters into combination with other mechanisms of the machine and serves to carry out one of the steps of my method of harvesting pod type vegetables. The sickle bar assembly will therefore be but briefly described and has not been shown in enlarged detail. In fact, insofar as my method is concerned, it would be possible to substitute for the sickle bar assembly other cutting mechanisms or a mechanism which would lift the pea vines out of the ground by the roots. Thereafter the machine would process the vegetable material as described herein. I therefore intend to include within the scope of the claims a method which comprises cutting the stems by means of a sickle bar or other stem cutting mechanism or a method which includes uprooting the pea plants and feeding the entire plant to the machine. Because the words stem and vine are sometimes used interchangeably in considering a plant, particularly a pea plant, I intend the expression found in some of the claims "removing the vines with the leaves and pods thereon and with at least part of the stem attached" to include: the uprooting of the entire plant; cutting the plant (stem) adjacent the ground line; or removing such portions of the growing plant as carry the pods together with leaves and vines (or stems) by a plant stripping or other similar operation.

Briefly the sickle bar assembly 28 comprises a plurality of rake fingers 66 which extend across the front of the machine and project beyond the cutter bar; a plurality of stationary cutter teeth 67; a reciprocating cutter bar 68 which passes beneath the stationary cutter teeth 67 in cutting relation thereof and has a sawtooth cutter edge 69. The sickle bar assembly includes a shoe 71 which rides upon the ground when the machine is advancing through a field just below the level of the rake fingers 66 to prevent the rake fingers from digging into the ground. The sickle bar assembly further includes a side bar or guard 72 for pushing aside the vines adjacent the swath being cut and means generally indicated at 73 comprising stationary cutter elements and vertically reciprocating cutter elements to assure that a clean line of demarcation defined by cut vines exists between the swath being currently cut and the adjacent vines to be cut on the next swath.

For the purpose of driving the reciprocating cutter bar 68, a crank pin 75 is made part of drive pulley 63 and has connecting rod 76 attached thereto. The connecting rod 76 extends forwardly of the machine and is pivoted by a ball and socket joint at 77 to a bell crank 78 pivoted on the shoe 71 at 79. The bell crank 78 is pivoted to a link 81 which is pivoted to the reciprocating cutter bar for the purpose of actuating it upon rotation of the pulley 63.

A second crank pin 82 is mounted on pulley 80 (directly below pulley 154, Fig. 2) and drives a connecting rod 83. Referring to Fig. 1, the connecting rod 83 is pivoted to a bell crank 84 by a ball and socket joint carried by the stationary cutter of the cutter assembly 73. The bell crank vertically reciprocates a link 86 which actuates the vertical reciprocating cutter bar 87 having cutter teeth all in a manner well known in the art.

Referring now to Fig. 1, after the stems have been cut, the material being processed comprises possibly a short length of stem with the leaves, pods and vines secured thereto. There is a tendency for this material to pile up just back of the reciprocating sickle bar. The conveyor unit generally indicated by the numeral 29, has a plurality of rake fingers 91 which are driven and mounted in a manner such that they reach in and over the sickle bar and its associated parts and carry the material inward toward the machine and subsequently to the primary or upper cutter bed generally indicated by the numeral 31. The operation of the rake finger conveyor will be more clear from an examination of Figs. 15 to 17 inclusive.

The rake finger assembly has a frame comprising longitudinally extending angle irons 92, one pair at each side of the machine (see Fig. 17). These angle irons are spaced apart vertically with respect to each other (Fig. 16) by side plates 93, several being on each side of the machine. The side plates are welded to the angle irons 92 as indicated at 94. At the ends of the conveyor frame on each side of the machine are a second pair of plates 96 and 97 which are welded to the angle irons 92 and aid in holding them in rigid vertical spaced relation and serve to support mechanism presently to be described. Extending across the machine to tie the two sides together is a pair of structural steel members 98 and 99 which are welded to the side plates 93. There is thus formed a rigid frame structure adapted to support the conveyor operating mechanism.

A continuous chain 101 is mounted at each side of the machine which has the usual chain links and chain hinge pins. These chains pass over driving sprockets 102 and driven sprockets 103. The lower runs of the chains ride upon the horizontal flanges of the lower angle irons 92 while the upper runs of the chains pass just beneath the horizontal flanges of the upper angle irons 92.

A plurality of the pivot or hinge pins of the chain are extended, as shown at 104, and are adapted to have pivotally secured thereto, as also indicated at 104, rake finger rods 106. Any desired number of rake finger rods may be provided extending transversely of the frame and preferably spaced equally along the chains. These rake finger rods 106 rigidly support the rake or feed fingers 91. The rake fingers 91 are spaced transversely of the machine along the rake finger rods 106 preferably at equal intervals. Any desired number of rake fingers are employed depending upon the width of the machine and the material being handled.

A tail arm or cam follower 107 is rigidly secured to each of the rake finger rods 106. The cam followers are in effect rigid with the rake fingers 91 so that the cam followers 107 control the swinging movement of the rake fingers, the rake fingers being moved by the chains in a counter-clockwise direction as viewed in Fig. 16. The cam followers 107 ride on a cam generally indicated by the numeral 108. This cam has a knee section 109, an upper horizontal run 110, a curved end portion 111 and a lower horizontal run 112. At the right of Fig. 16 the cam is discontinued and hence the rake fingers 91 are free to withdraw from the vines.

As the chains pass around the sprocket 102, the rake fingers 91 engage a curved plate 113 which supports the rake fingers in a substantially horizontal position, as indicated at 114, in which position the cam followers 107 are at the correct angle to engage the reversing knee section 109 of the cam 108. The rake fingers are flipped forwardly as the chains advance by the reversing knee 109 and are held in this position by the upper run 110 of the cam.

It will be appreciated from an examination of Fig. 16 in connection with Fig. 1 that as the rake fingers advance pitched forward at an angle of approximately 40 degrees with respect to the vertical, they are in a position to reach in over the sickle bar and effect a raking action on the mass of vines, leaves and pods just previously cut by the sickle bar. During their passage around and adjacent the driven sprocket 103, the position of the rake fingers is controlled by the curved portion 111 of the cam 108 to secure the proper raking action of the material and carry it to the right as viewed in Fig. 1 below the lower run of the chains.

Referring again to Fig. 1, by the time the rake fingers drop out of control of the lower run 112 of the cam 108, the material being conveyed has reached the lower or foremost set of cutter elements of the primary cutter bed generally indicated by the numeral 31. At this point conveyance of the material being processed is taken over by the rotatable cutting knives of the cutter bed 31 and the rake finger assembly or conveyor generally indicated by the numeral 32.

The driven sprockets 103 are mounted on a driven shaft 114 which is suitably journaled at its ends. For this purpose bearings 116 (Fig. 16) are formed in bearing blocks 117 which are movable in upper and lower guides 118. A screw 119 on each side of the machine passes through a member 121 rigid with the guides 118. The ends of the screws 119 bear against the bearing blocks whereby upon tightening up the screws the bearing blocks, together with the shaft 114, may be moved to the left, as viewed in Fig. 15, to take up any slack in the chain and to permit adjustment of the chain when wear occurs on the hinge pins of the chains.

The cam 108 is supported by a through bolt 122 from the transverse structural member 99. This bolt passes through slots 124 in the upper and lower runs of the cam 108. The lower end of the bolt 122 passes through the slot 124 in the lower run 112 of the cam 108 and the lower end is threaded to receive a nut for holding the cam 108 in position. At the structural member 98 the cam has a corresponding slot 124 and the bolt extends from the structural member 98 through a slot in the lower run 112 of the cam. By reason of the slots 124 in the cam 108 the cam may be shifted to the left as viewed in Fig. 16 so as to follow the adjustment of the bearing blocks 117 for the purpose of adjusting the chains.

The driving sprockets 102 are rigidly secured to a drive shaft 129 which extends beyond the frame of the conveyor unit 29 and is journaled in bearings 131 (Fig. 17) in bearing shells 132. The bearing shells 132 are rotatably mounted in brackets 133 which are bolted to the main frame 26. While the conveyor unit 29 is rigidly connected to the main frame it floats in the sense that the left hand end, as viewed in Figs. 15 and 16, is not rigidly supported but instead is free to be swung upward about the bearing shell 132 as a pivot. The side plates 93 at the forward end of the frame of the conveyor unit have extensions 134. These side plate extensions have lift eyes 136 formed therein.

Referring now to Figs. 1 and 2, a pair of lift links 137 apertured at their lower ends are connected by pins to the lift eyes 136. The lift links 137 have eyes 138 at their upper ends through which a pin extends, the pin also extending through eyes formed in a yoke 139. The yoke may be connected to any suitable lifting means such as a windlass. In the drawings, I have shown the yoke connected to the piston rod 141 of a hydraulic cylinder 142 to which hydraulic fluid may be supplied in any suitable manner. The hydraulic cylinder is pivoted at 143 to a bracket 144 welded to the main frame 26.

As previously mentioned, the sickle bar assembly pivots with respect to shaft 64 (Fig. 1) and the conveyor unit 29 is pivoted about the axis of shaft 129 (Fig. 16). A pair of chains 146 on opposite sides of the machine are connected to the frame of the conveyor unit 29 and the opposite ends thereof are connected to leaf springs 147 which are connected to the frame 60 of the sickle bar assembly 28 as by bolts (not shown). Between the leaf springs and the adjacent part of the sickle bar assembly 60 suitable adjustable snubbing clamps 145 may be provided to adjust the amount of lift applied by the springs on the sickle bar assembly 28.

In operating the machine the hydraulic cylinder may be relieved of pressure sufficient to allow the lift links down until the sickle bar shoe 71 rides lightly on the ground. That is, part of the weight of the sickle bar assembly 28 is taken up by the chains and leaf springs and applied through the lift links 137 to the hydraulic cylinder or other lifting mechanism employed. When the machine is passing over irregular terrain, the sickle bar assembly 28 may shift about the shaft 64 with little or no movement of the conveyor unit 29 because of the flexible connection provided by the chains 146 and springs 147. However, by the mechanism shown the lift links 137 may be drawn upward by means of the hydraulic cylinder 142 to lift the conveyor unit 29 until the sickle bar unit 28 is clear of the ground. Rapid movement of the machine over the ground is then possible or the machine may be mounted for rapid transportation on a trailer.

The drive shaft 129 is driven by means of a gear 151 (Fig. 15) rigidly secured to the shaft 129. The gear 151 is driven by a pinion 152 (Fig. 1) rigidly secured on a shaft 153 carried in any suitable manner from the main frame 26. A pulley 154 (Fig. 2) is rigidly secured to the shaft 153 and is driven by a belt 156 (Fig. 1) from the sickle bar shaft 64.

As previously mentioned and as will be apparent from Fig. 1, the material being processed passes from the conveyor unit 29 to the primary cutter bed 31. The primary cutter bed comprises a pair of structural members 157 on each side of the machine which are connected by cross members (not shown) to form a rigid sub-frame for the primary cutter bed. In Fig. 13, I have illustrated the secondary cutter bed but it will be understood that the frame structure and in fact the entire primary cutter bed is similar to that shown in Fig. 13. The frame structure thus formed is mounted on angle irons 158 and is removable from the machine as a complete unit. The cutter bed is provided with a side plate or guide wall 159 for the material being processed on each side of the machine, the plates being secured to the structural elements 157 as indicated at 161.

Mounted on the side structural members 157 is a plurality of bearing brackets 162. These brackets are shown in Fig. 1 but have been omitted in the perspective view of Fig. 3 which is a detailed view of a portion of the upper cutter bed. The bearing brackets are similar to those shown in Fig. 13. The bearing brackets 162 provide bearing supports for a plurality of shafts 163. A plurality of cutter discs, generally indicated by the numeral 164, is mounted on the shafts 163, the cutter discs being spaced transversely along the shafts to form a cutter bed or bank of cutter discs or snipper knives.

As shown most clearly in Figs. 1 and 2, the main shaft 58 extends across the machine and drives a pulley 166 rigidly secured thereto which through a belt 167 drives a pulley 168. The pulley 168 is mounted on one of the shafts 163 which extend across the machine. From this shaft 163, the remainder of the series of shafts 163 (Fig. 1) are driven by means of belts and pulleys mounted on the shafts 163, the arrangement of belts and pulleys being similar to that shown in Fig. 13.

As shown most clearly in Fig. 3, the snipper or cutter discs 164 mounted on the shafts 163 are separated from each other along the shafts by means of spacer sleeves 171 and are rigidly secured to the shafts 163 by being clamped between jamb nuts 165 at the ends of the shafts 163 as shown in Fig. 13. Thus the cutter discs and spacer sleeves rotate with the shafts as a unit. It will be understood that the spacing of the shearing or cutter discs may be varied from that shown by employing shorter or longer spacing sleeves. The number of shearing discs also may be varied from the number shown, depending upon the width of the machine and the character of the material being cut. Moreover, in the drawings, I have shown 7 transverse shafts 163 constituting the shafts of the main cutter bed 31. This also may be varied to suit the conditions encountered. The primary cutter bed 31 is thus made up of a large number of cutter discs. The cutter discs may be placed in alignment longitudinally of the cutter bed or may be placed in staggered relation on adjacent shafts. The cutter bed as a whole, as shown in Fig. 1, rises from the left of that view to the right.

Each of the cutter or snipper discs 164 has a plurality of openings or slots 173 extending inwardly from its periphery 174. The margins 176 defining these slots 173 are spaced apart a distance greater than the diameter of the vines, one of which has been indicated by the numeral 177 in Fig. 3. However, the pods are of substantially greater diameter than the vines and the margins 176 of the slots 173 are spaced apart a distance less than the diameter of the pods so that the pods cannot enter the slots and will in effect be rejected by the slots.

Continued rotation of the cutting discs causes the pods to ride out of any bridging relation they may have attained with respect to the slots 173. The slots may extend inward toward the center of the discs at any angle with respect to a radius. I have found, however, that the vines more freely enter the slots 173 if they extend inward at an angle to a radius such that the inner ends of the slots trail the outer ends thereof. It will be apparent from an examination of Fig. 3 and considering the direction of rotation of the discs as indicated by the arrows A, rotation of the cutting discs will automatically and positively force the vines 177 toward the bottoms of the slots. At the same time the rotation of the cutter discs moves the mass of vines in the direction in which the discs are rotating. In Fig. 3, I have indicated the direction of movement of the vines by the arrow B, that is, as viewed in Fig. 1 (Fig. 3 being taken from the opposite side of the machine), the vines move up the bank of cutter discs or the cutter bed from left to right.

As the cutter discs rotate, they pass in shearing relation to stationary cutter knives, generally indicated by the numeral 179, each having a cutter or shearing element 181. I have found that it is very essential the rotatable snipper or shearing discs 164 shall pass in close shearing relation to the stationary shearing knives or cutters 181. It is important that the cutting of the vine parts be clean so that there is no tearing or shredding. Torn or shredded fibres have a tendency to remain in the teeth and impair the cutting action.

In order to maintain proper shearing action and avoid tearing or shredding of the vines, I have found it desirable to hold the stationary shearing knife against the rotatable snipper discs under a yielding pressure. I have also found that the stationary shearing knife should preferably be mounted on a flexible support which will yieldingly urge the shearing knife 181 against the rotating face of the cutter disc, particularly to allow the stationary shearing knife to follow any out of trueness of the cutter discs and thereby maintain the shearing, clean cutting relationship of the parts.

For the above purposes, the shearing knives 181 are supported by flexible arms 182. These arms are biased or tensioned in a direction so as to cause the shearing knife 181 to exert a pressure against the face of the cutter disc. The flexible arms are held stationary at their lower ends by means of spacer sleeves 183 which extend over a rectangular rod or fixed bar 184. The flexible arms at their lower ends are therefore provided with rectangular openings 186 to fit over the rectangular bars. When the arms are mounted on the bar and spaced properly by the sleeves, the arms are rigidly held in position but are free to flex slightly to conform to any out of trueness of the cutter discs.

In Figs. 4 and 5, I have illustrated how the shearing knives 181 are carried on the upper ends of the flexible arms 182. Such means may comprise openings 187 and 188 formed in the body of the shearing knives 181. Riveted as indicated at 189 to the upper end of the flexible arm 182 is a retaining member 191 which has a loose fit in the opening 187 but is retained therein by a flange 192. A second retaining device 190 is riveted to the upper end of the flexible arm 182 and has a loose fit in the opening 188. By this means although the shearing knife 181 is yieldingly held against the face of the rotating snipper disc 164, not only may the flexible arms 182 yield but also the shearing knife 181 may shift its position about the retaining element 191 to a limited extent to maintain shearing relation with the snipper disc with the cutting edge 193 thereof at substantially a right angle to the direction of movement of vines caught in the slots 173. The edge 194 of the stationary shearing knife is also provided with a sharpened cutting edge to scrape off any material which may collect on the face of the cutter disc adjacent the knife.

As will be observed from an examination of Fig. 3, the flexible arms 182 lie between two adjacent parallel shafts 163. While the arms thus do to some extent restrict the space which exists around and between the cutter discs, such spaces do exist over the entire area of the bed through which cut vines, leaves and pods may fall. As to material which is uncut, the arms serve as a bridge to buoy up the mass of material and permit the cutter discs during their rotation to urge the uncut vines, leaves and pods in the direction of the arrow B of Fig. 3 up the cutter bed. Each of the arms 182 is provided with a heel 195 which aids in forming this bridge and to partially prevent a large mass of uncut material from lodging between adjacent arms and between adjacent shafts, and to guide uncut vines to the succeeding cutter discs.

The shearing elements or cutter discs mounted on the shaft 163 at the right of Fig. 3 may be offset with relation to the shearing elements or cutter discs mounted on the shaft at the center of Fig 3. Similarly the cutter discs throughout the bank of cutter discs may be offset with respect to each other. This is perhaps the more desirable arrangement when only one cutter bed is employed. However, when two or more cutter beds are employed it is desirable to place the cutter discs in alignment up the cutter bed to allow larger unimpeded passages through which cut vines and leaves may fall. Thus the material conveyed to the primary cutter bank is fed over the sets of cutter discs comprising the bank and the cutter discs and the vines left uncut by the first set of cutting elements at the right of Fig. 3 tend to be caught or snagged and cut upon entering the slots in the rotatable cutter discs of succeeding sets until the material is sufficiently finely divided to drop through the spaces in the bank of cutter elements to a conveyor presently described lying beneath the primary cutter bed 31.

The above described arrangement of cutter discs 164, shearing knives 181 and flexible arms 182 for the most part operates satisfactorily. However, at times during the operation, there is a tendency for the partly cut vines and pods to clog between the flexible arms and fixed bars upon which they are mounted. Occasionally also uncut vines may start winding on the rotating spacer sleeves or hubs 171. For this reason I have developed what may be considered the preferred form of cutter discs and cutter knives of which the cutter bed of Fig. 13 is made up, shown in Figs. 6 and 7.

In the form of the invention shown in Figs. 6 and 7, the shafts have been again indicated by the numeral 163, the cutter discs by the numeral 164, the direction of rotation of the cutter discs by the arrow A, and the direction of movement of the vines, leaves and pods up the cutter bed by the arrow B. The shape of the slots 173 adjacent the periphery of the cutter discs for the reception of the vines is approximately the same as shown in Fig. 3. The same principles are retained, namely that the slots accept the vines and reject the pods and the inner portions of the slots accomplish the hooking or snagging action with respect to the vines above described.

As in the case of the construction shown in Figs. 3 to 5 inclusive, the cutter discs 164 are clamped on the rotating shafts 163 between collars or spacing sleeves 196. Between each pair of cutter discs 164 on the same shaft 163 and stationary with respect to the rotating collars or spacing sleeves 196 are bushings or mounting hubs 197. One end of each of the mounting hubs 197 is enlarged to provide an abutment 198 or thrust bearing against the adjacent cutter disc. Each mounting hub is further provided with an annular shoulder 199 against which the annular end of a cutter holder casting 201 butts. One entire side of a cutter holder casting 201 including the bore thereof is open-sided as indicated at 202 so that it may be slid sidewise over the mounting hub 197 and be secured thereto by means of a screw 203.

By the means thus described, each cutter holder casting with the cutter knives thereon, as will presently appear, may be removed from the machine without removal of the cutter discs, spacing sleeves 196 or mounting hubs 197, to effect repairs, untangling of vines or sharpening of cutting or shearing knives.

The cutter holder castings 201 and the mounting hubs 197 by reason of the screws 203, are prevented from rotating with the cutter discs and spacing sleeves 196 by bars 206. Each bar 206 is fastened in a slot formed in the cutter holder casting 201 by means of a rivet 207. The bar bridges the gap between two adjacent cutter disc shafts 163 and is loosely lodged in a slot 208 formed in the next adjacent cutter holder casting. Thus the bar 206 may be freely removed with the cutter holder casting to which it is secured upon removal of the screw 203.

At the upper part of the cutter holder casting 201 a rectangular slot 211 is cut in the side edge of the casting for the reception of a spring 212 which is essentially flat but has curved ends, one curved end being formed as shown at 213. The spring 212 is mounted in the margins of the slot 211 and held in position by means of a pin 214 which extends through bores formed in the cutter holder casting, the spring being lodged behind the pin.

The formed end 213 of the spring extends loosely into a correspondingly formed recess 216 formed in the cutting or shearing knife 181 which may be similar to the cutting knife 181 of Fig. 4. The cutting knife similarly has a cutting or shearing edge 193 and a scraper edge 194. It will thus be observed that the cutting knife 181 of Fig. 7 is flexibly mounted so that it may shift its position slightly and still is firmly and flexibly pressed against the face of the cutter disc by the spring 212. It will further be observed that the spring 212 is recessed in the cutter disc holder so that the smooth and rounded periphery 217 of the cutter disc holder is presented to the material being cut. Most of the mounting spring for the cutter knife 181 in which material is likely to be caught is enclosed.

I have found it desirable to provide a baffle plate 218 to prevent winding of the vines around the adjacent rotating parts. The baffle plate 218 may be cast integral with the cutter holder casting 201 and preferably extends nearly the full width between adjacent cutter discs and outwardly to a point adjacent the inner part of the circle of rotation of the cutter slots as shown at 219. The outer edge of the baffle 218 is spaced inward from the periphery of the cutter disc as indicated at 219 because any vine part snagged in one of the slots at its point of passing the baffle would be shredded or torn. As previously stated, it is very desirable that all cuts be made without shredding or tearing to prevent clogging of vine parts.

Since the baffle plate 218 does not extend to the periphery of the cutter discs, it is possible that some vine parts snagged in the slots may be carried past the baffle and upward to the under side of the bar 206. It is of course essential that a substantial clearance exist between the bar 206 and the adjacent rotating cutter discs. Vine parts thus carried upward past the baffle to the under side of the bar 206 might become jammed between the bar and the cutter disc. To prevent this possibility a second cutting or shearing knife assembly, generally indicated by the numeral 221, and similar to the cutting knife assembly shown in Fig. 7, is provided below the bar 206 so that any vine parts carried past the baffle and upward toward the bar 206 may be sheared clean and fall freely to the conveyor located below the primary cutter bed 31 as will presently appear.

Figures 8, 9:
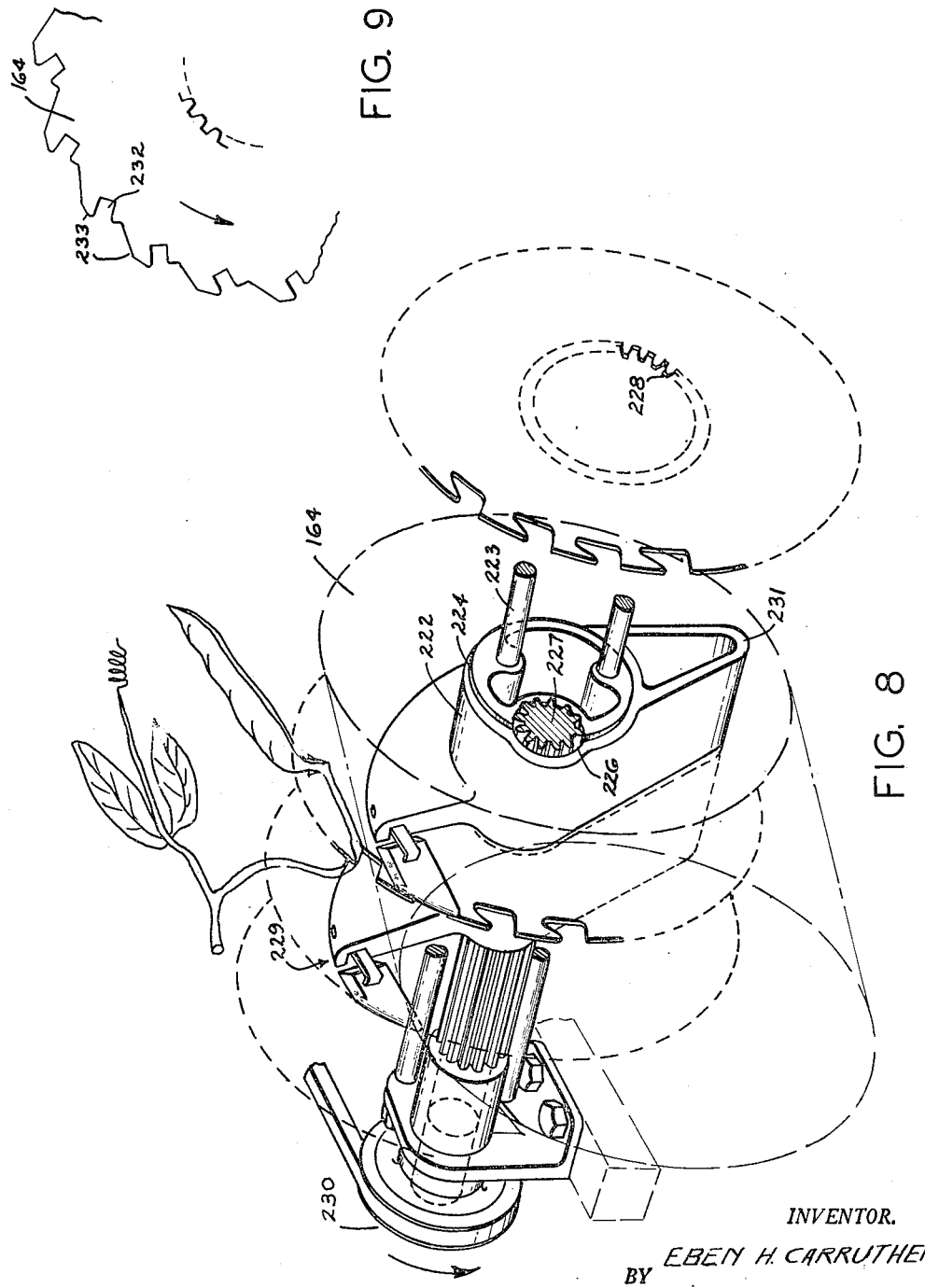
Fig. 8 is another view partly in section somewhat similar to Figs. 3 and 6 showing another form of stationary and rotatable cutter blades.
Fig. 9 is a fragmentary view showing an alternate form of teeth for the rotatable cutter blade or disc.

In Fig. 8 I have shown another form of cutter discs and cutting or shearing knife assemblies to make up a bank of shearing elements or cutter bed. In this form of the invention the cutter discs 164 are supported by a series of castings 222 which are held stationary and bolted together by long through bolts 223 extending through bores formed in the castings 222. The cutter discs 164 are free to rotate on shoulders 224 formed on the cutter holder castings 222.

The cutter holder castings are provided with eccentric bores 226 through which a long pinion 227 extends. The pinion is rotated in a manner similar to the shafts 163 by the means indicated at 230. The teeth of the pinion mesh with internal teeth 228 provided in the bores of the cutter discs. Thus the cutter discs are rotated on the shoulders 224 by means of the pinion 227. The cutting and shearing knife assemblies, generally indicated by the numeral 229, may be similar in all respects to that shown in Fig. 7. The cutter holder casting 222 is preferably provided with an integral extension 231 which acts as a baffle to prevent winding of the vines.

One advantage of the arrangement of parts shown in Fig. 8 over that shown in Fig. 6 is that no exterior torque arms such as the bars 206 of Fig. 6 are required to prevent the cutter holder castings 222 from rotating and maintain the cutting or shearing knife assemblies 229 stationary. The construction of Fig. 8 except for the cutter knife assemblies 229 presents smooth external surfaces, reducing still further any possibility of clogging or winding of vines. It will be noted particularly with respect to the forms of the invention shown in Figs. 6 and 8 that for the most part the cutter bed is open, that is, the cutter discs and the cutting or shearing knives and their associated parts, occupy only a small portion of the total area of the cutter bed. Thus cut vines, leaves and pods are free to fall through the spaces existent in the bed to the conveyor located directly below.

In Fig. 9, I have shown an alternate form of cutter tooth or slot on the cutter disc 164. The form of tooth or slot is designed to permit more free entry of the vines into the slots, in other words, a better vine hooking or snagging action. The slot is indicated by the numeral 232, the mouth of which is less than the cross-sectional area of the pods. However, the tooth form shown presents an outer peripheral mouth defined by the margins 233 which is relatively wide to permit more free entry of the vines. It will be observed that substantially the entire periphery of the cutter disc is occupied by the wide mouths 233 so that most of the periphery of the cutter disc is available for vine entry and subsequent snagging in the slots 232.

Referring now to Figs. 1 and 14, the rake finger assembly 32 lies directly above the main cutter bed 31 and the plane thereof considered as a whole lies parallel to the plane of the main cutter bed. The rake finger assembly constitutes a unit, as shown in Fig. 14, which is carried by transverse angle irons 236 so that the rake finger assembly is removable from and may be inserted into the main frame as a unit. The angle irons 236 are carried by the main frame by means of brackets 237. The brackets are located on opposite sides of the main frame and have a series of spaced openings as shown in Fig. 1. The brackets may thus be adjusted on the main frame so as to enable the raising and lowering of the rake finger assembly 32 to adjust its position relative to the level of the main cutter bed 31.

As shown in Fig. 14, the frame of the rake finger assembly comprises structural elements 238 formed into a rectangle which is removably secured to the transverse angle irons 236 (Fig. 1). Welded or otherwise rigidly secured to the rectangular structural elements 238 are two depending U-shaped structural elements 239. Carried on the under side of the rectangularly arranged structural elements 238 are bearing brackets 241 which support a driving crank shaft 242 and a driven crank shaft 243. A pulley 244 is mounted on the projecting end of the driving crank 242 and is driven by a belt 246 which extends around a pulley 247 (Fig. 2) rigidly secured to the main shaft 58. The driving crank shaft 242 extends transversely to the opposite side of the rake finger assembly 32 and its projecting end has a pulley 248 rigidly secured thereto over which a belt 249 extends to drive a pulley 251 mounted on the end of the driven crank shaft 243.

The crank shafts 242 and 243 carry bearing brackets 252 from which depend four longitudinally extending support members 253 and 254. The support members are in pairs, the members 253 being offset on the crank shafts 180 degrees with respect to the members 254 so that, for example, the members 254 are in their uppermost position when the members 253 are in their lowermost position. Each of the support members carries a plurality of supporting brackets 256 from which depend spring rake fingers or pusher elements 257. These spring fingers may be of any desired construction secured to the brackets in any suitable manner. Preferably, however, they are formed with coil spring portions 258 to increase the resiliency of the fingers and enable them to yield to an appreciable extent when they engage a resistant mass of material. Secured as by welding to the under sides of the structural members 239 is a plurality of parallel longitudinally extending rods 259. The ends of the rake fingers extend downward through the spaces between the parallel rods 259 and are guided by them.

When the pulley 244 is rotated in the direction indicated by the arrow, the lower ends of the rake fingers move in a circle indicated by the arrows C. The rake fingers on the members 253 and 254 thus alternately raise and lower. When raised, portions of the vine sections transversely of the machine can move ahead relatively freely under the urging of the rotating cutter discs. As the fingers rise as indicated by the arrows C the vines may be rolled to some extent to offer new vine sections to the cutter discs. Since members 253 are rising when the members 254 are dropping there is a rolling action which has a tendency to pull apart or open up the vine mass. Further when the spring vine fingers are moving downwardly and forwardly, they are opposing the tendency of the cutter discs to move the mass of material to the right as viewed in Fig. 14. This effects a further breaking up of the mass and aids in urging the vines into engagement with the rotating cutter discs. The rods 259 serve not only to guide the spring rake fingers 257 but also serve to maintain the mass of material in close proximity to the upper peripheries of the cutter discs.

In Figs. 20 and 21, I have shown an alternate form of rake finger assembly. The rake fingers of this assembly are resilient and similar to the rake fingers 257 and have their lower ends extending between the cutter discs. This rake finger assembly is stationary, that is, the crank shafts and pulleys are omitted and the rake fingers are supported from structural members 260 which extend longitudinally of the structural elements 238 (Fig. 14) which form the rake finger assembly frame.

As previously mentioned the level of the rake finger assembly may be raised or lowered to bring the lower ends of the spring fingers into the desired relation with the cutter discs. At times vines, leaves and pods are fed to the main cutter bed at a rate greater than the capacity of the cutters. At other times large vine portions may pass over the cutter bed without being cut in small pieces but still have nearly all the pods removed. Such occasional masses of material are preferably discarded from the machine rather than attempt to pass them to the secondary cutter bed. To enable discharge of such excess material from the machine the helical conveyor generally indicated by the number 33 is provided.

The conveyor 33 extends transversely of the machine and comprises a helical blade 261 driven in a continuous manner by a shaft 262 to which it is rigidly secured. The shaft is journaled in bearings carried by side plates 263 supported from the main frame, the side plate at the discharge side of the helical conveyor being supported by an extended bracket 264. The use of an extended bracket provides a space 266 at the side of the machine through which the excess material may discharge. The shaft 262 is driven by a pulley and belt assembly indicated by the numeral 267, the driving pulley of which is mounted on the last cutter disc shaft 163 of the main cutter bed 31 (see Fig. 2). The mass of material discharged from the machine usually has some pods mingled with it. It is picked up in cutting the next swath in which swath the sickle bar may break up the mass or the mass may be broken up as it is repassed through the machine.

As shown most clearly in Fig. 1, a pulley 271 is mounted on the last or uppermost of the shafts of the primary cutter bed 31. A belt 272 passes over this pulley and over a pulley 273 rigid with a shaft 274. This shaft has a long roll fixed thereto extending across the machine over which a draper or conveyor belt 276 passes. The draper belt also passes over an elongated idler roll 277 fixed to a shaft suitably journaled in the machine. The draper belt 276 considered as a whole is inclined in a plane substantially parallel to the plane of the primary cutter bed. The upper run of the draper belt is spaced closely with respect to the bottom of the primary cutter bed to receive vines, leaves and pods which have been at least partially cut in passing through the primary cutter bed and which drop through the spaces in the primary cutter bed. The draper belt then transfers this partially cut material to the secondary cutter bed generally indicated by the numeral 34.

The secondary cutter bed in general lies parallel to the primary cutter bed but extends therebeyond as shown in Fig. 1. The material conveyed to it by the draper belt has already been cut in small enough pieces to drop through the spaces in the primary cutter bed or to receive material which has been cut sufficiently small by the time it leaves the last set of cutters mounted on the last or uppermost shaft of the primary cutter bed to drop between the last set of cutters and the helical conveyor. As previously mentioned, vines insufficiently cut to drop through the space beyond the last set of cutting elements of the primary cutter bed are discharged from the machine by the helical conveyor unit 33.

The secondary cutter bed, (Fig. 13) includes a rectangular frame 279 made up of structural elements carried by angle structural members 281 which extend transversely of the machine. As in the case of the primary cutter bed, a guide wall 282 is provided on each side of the machine for retaining the material being processed within the confines of the secondary cutter bed.

The secondary cutter bed further comprises a series of shafts 283 suitably journaled, as indicated at 284, driven by the belts and pulleys generally indicated at 286. A driving pulley 287 for the secondary cutter bed is driven from the main shaft 58 by means of a belt and pulley 288 (Fig. 2).

It is unnecessary to describe the stationary and rotatable cutting elements or knives of the secondary cutter bed since they may be similar to those shown in Figs. 3 to 5 inclusive and the alternative and perhaps preferred constructions of Figs. 6 and 7, or the alternative constructions of Fig. 8. It is sufficient to state that any desired number of sets of stationary and rotary cutter knives may be employed in the secondary cutter bed. Four sets of cutter elements have been shown in the drawings, but this of course is optional. It is sufficient to state that the material which reaches the secondary cutter bed has, for the most part, been at least partially cut and in fact comprises relatively short lengths of vines with leaves thereon; some pods substantially free of vines and leaves; and some pods with relatively short lengths of vines and perhaps some leaves thereon. In passing through the secondary cutter bed, the vines and leaves are further cut until they are relatively finely divided, to the end that at the discharge of the secondary cutter bed the pods are substantially free of vines and leaves. If desired cutter discs may be spaced more closely on the shafts in the secondary cutter bed to the end that the spaces in the secondary cutter bed through which material may fall is decreased thereby insuring that the material will be more finely divided as it passes through the secondary cutter bed.

The last shaft 283 (Fig. 13) of the secondary cutter bed carries a pulley 291 which drives a belt 292 (Fig. 1) extending around a pulley 293 rigid with a shaft 294. This shaft constitutes the drive shaft of a second draper belt 296. The draper belt extends over rolls mounted on the shaft 294 and an idler shaft 297. The draper belt 296 in general extends parallel to the secondary cutter bed and is adapted to receive material dropping through the spaces between the cutter elements or flowing over the last and uppermost cutter elements of the series as viewed in Fig. 1.

Mounted on the engine shaft (Figs. 1 and 2) is a second pulley 301 which through a belt 302 drives a pulley 303 mounted on a shaft 304. Rigidly secured to the shaft 304 is a plurality of fan blades 306 (Figs. 10 and 11). The shaft 304 is journaled in brackets 307 carried by a pair of struts 308 supported from the main frame as shown at 309 (Fig. 1). The struts are also tied to structural members 311 connected to the main frame and which also serve as part of the support for the secondary cutter bed 34.

The fan blades 306 constituting part of the blower may be of any suitable design and shape and are mounted in a generally elongated cylindrical housing 310 which has a volute-shaped passage 312 through which air is discharged in the direction indicated by the arrow D into a discharge passage 313. Air enters the blower through axial intake passages 314 located on opposite sides of the machine. Air flowing from the discharge passage 313 flows into a conduit 316 into which the material relatively finely divided and comprising leaves, vines and pods is discharged from the secondary draper belt 296.

For the purpose of more evenly spreading the material transversely of the machine and more important to regulate the volume of flow of material to the conduit 316 more uniformly, a brush 317 is provided above the end of the secondary draper belt 296 as shown in Fig. 10. The brush 317 is preferably provided with rubber fingers sufficiently flexible to allow a yielding action and permit material to flow between the belt and the brush and drop into the conduit 316. The brush 317 tends to hold back material when the flow on the conveyor is excessive since the brush and the conveyor are relatively closely spaced.

The brush 317 is mounted on a shaft 38. The shaft 318 is driven in a counterclockwise direction as viewed in Fig. 10. The shaft 318 is driven from the blower shaft 304 by means of pulleys 319 (Fig. 11) over which a twisted belt 321 passes. Thus as viewed in Fig. 10 the draper belt is rotating clockwise and the brush 317 is rotating counterclockwise so that both the belt and the brush aid in the discharge of material, to some extent throwing the material into the conduit, but the spacing of the belt and the brush is such that the gap between them is relatively narrow. Thus while the effect is to assist the discharge, at the same time the rate of flow of material is regulated to a relatively thin approximately constant stream extending transversely of the machine.

As the material drops or is discharged over the end of the second draper belt 296, it is acted upon by the flow of air through the conduit 316. The lighter leaves and vines are carried along with the air stream and are discharged out of the end 322 of the conduit 316. The more dense pods for the most part free of vines and leaves drop into a container 323 carried on a platform 324 at the rear of the machine. Thus the material discharged by the secondary draper belt 296 is separated by the relative specific gravity or density of the elements of the material.

In practice I have found it desirable to employ a damper or valve 326 in the conduit 316 for regulating the air flow. The damper 326 is in effect part of the rear wall of the conduit 316 and is adjustable at the top and bottom thereof by the means indicated at 327. Movement of the damper 326 further into the conduit 316 decreases the cross-sectional area of the conduit thereby increasing the velocity of air flow past the end of the secondary draper belt 296. Thus by regulating the velocity of air flow the discharge of the lighter leaves and vines through the outlet 322 can be assured and the dropping of leaves and vines into the container 323 along with the pods can be substantially avoided. As shown in Fig. 10, the relatively finely divided leaves and vines are spread back upon the land but if desired means may be provided for receiving this material in, for example, bags and employing it as ensilage.

In Fig. 18, in order to summarize the operation of the machine, I have diagrammatically illustrated the flow of material through the machine. The machine is drawn through a field of growing peas in a substantially continuous manner, the propelling of the machine being normally interrupted only when the operator notices that material is being carried into the machine faster than it can be digested. The sickle bar cuts the stems of the vines normally close to the ground level. The fingers of the conveyor unit 29 reach out over the sickle bar, catch on the material and convey it, as indicated by the arrows, to the primary cutter bed. Cut material drops to the primary draper belt 276 through the spaces existant in the bed or through the space between the end of the primary cutter bed and the helical conveyor 33. The helical conveyor discharges the uncut material sidewardly from the machine in a position to be picked up as the machine cuts the next swath.

The primary draper belt discharges the partly cut material into the secondary cutter bed 34 where it is cut into more fine pieces and the pods emerge from the secondary cutter bed substantially free of vines and leaves. From the secondary cutter bed the material, now a mixture of relatively finely cut vines and leaves and pods substantially free of vines and leaves is conveyed by the secondary draper belt and flows in a stream regulated by the brush 317 into the separator unit 36 where the relatively heavy pods and the relatively lighter leaves and vines are separated from each other, the relatively light leaves and vines being acted upon to a greater extent than the relatively heavy pods.

The machine of my invention has been designed to effect a radical change in the present practices of harvesting peas. In small pea operations the cut vines with the leaves and pods thereon are transported to the canning plant where the material is threshed or beaten until the pods are broken down and the peas are thereby separated from the pods. This method of operation requires the transportation of a large bulk of material in some cases for long distances. That is, the pods represent only a small proportion of the bulk constituting the vines, leaves and pods and the transportation of this material to a canning or freezing plant constitutes an important element of cost.

For the above reasons in large pea operations machines have been developed which are usually set up in the fields to which the vines and leaves with the pods thereon are brought by trucks. These pea separating machines comprise beaters which act upon the mass of material with such force that the pods are broken down and the peas are separated from the pods. In the process a relatively large percentage of peas are damaged. Moreover, the refuse, vines and leaves are in a relatively bulky tangled state and it is difficult to spread this material over the land. When an effort is made to employ it as ensilage, it is a relatively bulky tangled mass which is difficult to handle.

More important than the above factors is the fact that there is a considerable delay between the time the vines are cut from the stems in the fields to the time when the peas are separated from the pods. This is due to the distance the material has to be transported and due to the fact that the trucks carrying the material do not reach the beating or pea separating machine in an even flow and considerable waiting time is encountered in practice. More important still is the fact that pea fields are notoriously dusty and hot at the time peas are harvested. The separated peas are thus not only exposed to damage from the beaters but are also exposed to dust conditions. Under present conditions it is difficult to secure a good pack because as is well known exposure of peas to atmospheric conditions has a deleterious effect upon them. Peas should be packed "fresh." Upon exposure to atmospheric conditions, peas deteriorate in quality in a matter of hours.

With my method of harvesting peas, trucks may follow after the harvesting machine, above described, and be filled with pods with the peas therein within a few minutes after the material has been cut from the stems of the growing plants. As soon as a truck has been filled with pods, the pods may be transported to the canning or freezing plant. Thus the pods with the peas therein, protected from atmospheric conditions, can be en route to the canning or freezing plant within minutes after the vines, leaves and pods have been cut from the growing plants.

The new harvesting method of my invention also enables radical departures from the methods now employed at canning or freezing plants. In accordance with present large commercial practices the peas, separated from the pods, arrive at the plant and must be canned or frozen as quickly as possible to prevent exposure of the peas to atmospheric conditions. During the harvesting season it is almost impossible to regulate the flow of peas evenly so that canning or freezing operations may be carried out in a well regulated production manner. Because the peas cannot be held a day or more after the pods have been opened without the peas losing their "freshness," in practice it is necessary to harvest the peas only at a rate the canning or freezing plant can handle. When the peas ripen very rapidly as occurs in some seasons large quantities of peas must be left uncut in the fields or if they ripen past canning or freezing quality they are good only for seed or splits. At times also, even during the harvesting season the flow is so small that workers must either wait around for peas to process or be sent home by the cannery management until more peas arrive at the plant.

Another considerable factor adversely effecting costs in present practices is the fact that the pea harvesting season is of relatively short duration—not more than six to eight weeks. During this interval the entire crop must be canned or frozen. A canning or freezing plant of sufficient size to take care of peak loads must therefore be provided thereby increasing the sizes of buildings required. Moreover, the plant must be provided with considerable duplicate machinery and a large number of temporary workers must be employed. Not only is the fixed cost of operations materially increased due to the size of the canning or freezing plant necessary to take care of peak loads but also a considerable pressure is applied on the management of the plant to get the peas processed and into the cans or packages for freezing in the relatively short space of time during which the harvesting season extends.

With the method of my invention, the size of the plant may be geared to carry on continuous operations over a longer period of time. A smaller force of seasonal workers is necessary and employment of cannery or freezer plant workers may be over a longer period of time. Overtime operations to a large extent can be avoided and the production of the plant may proceed in an orderly, regularly scheduled manner.

My method of harvesting peas which includes all of the steps up to the actual placing of the peas into cans or packages for freezing contemplates the storage of the peas while in the pods and as they are received from the fields in rooms in which the temperature and humidity conditions are controlled thereby maintaining the peas in the best possible condition for later canning or freezing. In plants where freezing facilities are available, the pods with the peas therein may be frozen in bulk. In freezing plants where it is necessary to keep the peas in frozen storage after they have been placed in the freezing containers and prior to shipment into the channels of distribution, it is immaterial except for the somewhat greater bulk involved, whether the pods with the peas therein are stored under freezing conditions or whether the peas are maintained frozen in containers. The cost is approximately the same. When the peas are then removed from the pods, they may be canned or frozen in a substantially "fresh" condition.

Figure 22:
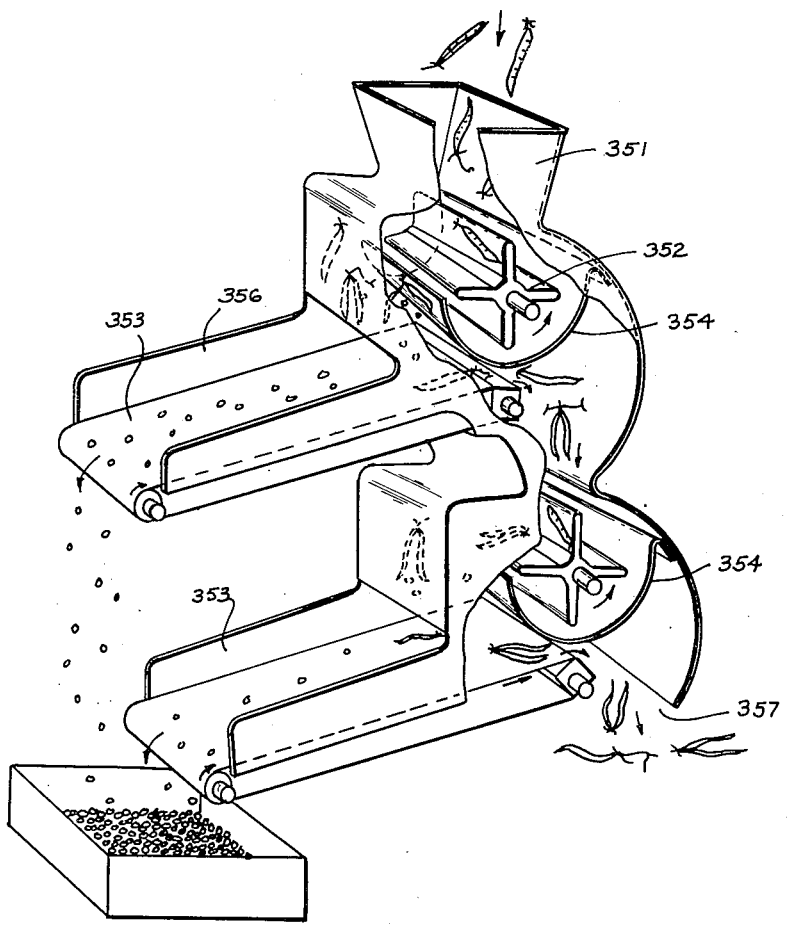
Fig. 22 is a perspective view somewhat diagrammatic illustrating how the peas may be removed from the pod by impact.

A mechanism for separating the peas from the pods has been shown in Fig. 22. This pod opening mechanism comprises a hopper 351, a pair of beaters 352 mounted in series and a pair of conveyors 353. The beaters may be of any suitable construction and driven from any suitable source of power at a speed sufficient to exert a considerable impact upon the pods as they drop from the hopper through the machine. The beaters may be operated in partial enclosures 354 and the impact of the beaters opens the pods and throws the pods and peas onto the conveyor apron.

The conveyors are provided with confining side walls 356 and are inclined in a direction such that the peas will roll down the conveyor aprons into a container. The conveyors are rotated in a direction opposite their direction of inclination. That is, the conveyors are rotated clockwise as viewed in Fig. 25 so that the pods which cannot roll are returned by the upper conveyor to a position above the lower beater into which they drop for further beating. The pods are then discharged as indicated at 357 by the lower conveyor to a point of disposal of the pods. The pods may be opened in a frozen condition. No separate thawing step need be employed. After the peas have been separated from the pods they may be graded and then canned or frozen by the usual canning or freezing methods.

It will be apparent that I have provided a novel method of harvesting and preparing pod type vegetables particularly peas for market, a method which radically departs from present commercial practices. While I have shown and described the preferred forms of mechanisms of my invention by which the method may be carried out, it will be apparent that various changes and modifications may be made therein, particularly in the form and relation of parts, without departing from the spirit of my invention as set forth in the appended claims.

I claim:

1. A method of harvesting pod type vegetables which comprises cutting the stems of growing plants to cut the vines with the leaves and pods thereon from the stems, cutting the vines and leaves from the pods, separating the leaves and vines from the pods, all of said operations being carried out in the field in which the vegetable is being harvested, substantially immediately removing the pods from the fields and transporting the pods unopened and substantially free of vines and leaves to a food packing area, said operations being carried out in a relatively short time interval to the end that the vegetable is received at the packing area in a fresh condition.

2. A method of harvesting pod type vegetables in accordance with claim 1 wherein at least a large portion of the harvested pods are frozen in unopened condition and retained in frozen bulk storage until the pods are to be opened and the product packed in containers.

3. A method of harvesting pod type vegetables in accordance with claim 1 wherein at least a large portion of the harvested unopened pods are frozen in bulk storage until the product within the pods is to be packed and at that time the pods are opened and the product separated from the pods without first thawing.

4. A method of harvesting pod type vegetables which comprises removing the vines with the leaves and pods thereon and with at least part of the stem attached from a field of the growing vegetable, conveying said removed vegetable material to a cutting area, and cutting the pods from the remainder of said removed vegetable material in said area by subjecting the material to a number of successive cutting actions, said operations of removing, conveying and cutting being carried out substantially continuously on a movable conveyance which substantially continuously advances through said field.

5. A method of harvesting pod type vegetables which comprises removing the vines with the leaves and pods thereon and with at least part of the stem attached from a field of the growing vegetable, conveying said removed vegetable material to a cutting area, cutting the pods from the remainder of said removed vegetable material in said area by a number of successive cutting actions and while said material is being substantially continuously moved through said area, and separating the pods from the remainder of said material, said operations of removing, conveying, cutting and separating being carried out substantially continuously on a movable conveyance which substantially continuously advances through said field.

6. A method of harvesting pod type vegetables which comprises removing the vines with the leaves and pods thereon and with at least part of the stem attached from a field of the growing vegetable, conveying said removed vegetable material to a cutting area, cutting the pods from the remainder of said removed vegetable material in said area by a number of successive cutting actions and while said material is being substantially continuously moved through said area, and separating the pods from the remainder of said material, said operations of removing, conveying, cutting and separating being carried out substantially continuously on a movable conveyance which substantially continuously advances through said field, the separating step being accomplished by a flow of air through the cut vines, leaves and pods.

7. A method of harvesting pod type vegetables which comprises removing the vines with the leaves and pods thereon and with at least part of the stem attached from a field of the growing vegetable, conveying said removed vegetable material to a cutting area, cutting the pods from the remainder of said removed vegetable material by a number of successive cutting actions and while said material is being substantially continuously moved through said area, separating the pods from the remainder of said material, said operations of removing, conveying, cutting and separating being carried out substantially continuously on a movable conveyance which substantially continuously advances through said field, transporting the separated pods unopened and substantially free of vines and leaves to a packing area to the end that unopened pods may arrive at the packing area in a minimum time interval after the removing operation whereby the unopened pods are exposed to atmospheric conditions for a minimum of time and the product within the pod is protected against the deleterious action of the elements.

8. A method in accordance with claim 7 wherein the separating operation is accomplished by a flow of air through a mixture of cut leaves, vines and pods substantially free of vines and leaves fed to said flow.

9. A method in accordance with claim 7 which includes the step of freezing unopened pods representing a large part of the harvest in bulk storage until the product within the pods is to be packed to the end that the packing area may operate over a greater time period than the normal harvest season.

10. A method in accordance with claim 7 wherein the pods are opened in the packing area by subjecting the pods to impact.

11. A method in accordance with claim 7 which includes the step of storing unopened pods in the packing area under temperature and humidity controlled conditions.

12. In a method of harvesting pod type vegetables which have been removed from the field attached to their vines the steps of: advancing a loose mass of such vines and pods, grasping the vines only and severing the same from the pods, and separating the pods in their original state from the severed vines.

13. In a method in accordance with claim 12 wherein the separating step is accomplished by directing a flow of air through the severed mass of material.

14. In a method of harvesting pod type vegetables which have been removed from the field attached to their vines the steps of: advancing a loose mass of vines, leaves and pods to a severing area, grasping the vines and severing the vines and leaves from the pods by a multiplicity of successive and rapidly repeated grasping and severing actions, exerting a loosening action on said mass as it passes through said area to maintain the mass sufficiently loose so that the vines are exposed to said grasping and severing actions and separating the pods in their unopened original state from the vines and leaves.

15. In a method in accordance with claim 14 wherein the separating step is accomplished by directing a flow of air through the severed mass of material as it falls loosely and freely by gravity.

16. In a method of harvesting pod type vegetables which have been removed from the field attached to their vines the steps of: advancing a loose mass of vines, leaves and pods to a severing area, grasping the vines and severing them and the leaves from the pods in said area, said grasping and severing actions being repeated rapidly and a multiplicity of times and said grasping actions being the primary force urging the material through said area to the end that the material flows through said area in an essentially continuous manner, and separating the pods in their original unopened state from the vines and leaves severed therefrom.

17. In a method in accordance with claim 16 wherein a loosening action is exerted on said mass as it is urged through said area to maintain the mass sufficiently loose so that the vines are exposed to said grasping and severing actions and wherein the separating step is accomplished by directing a flow of air through the mass after the pods are essentially free of leaves and vines.

18. In a method of harvesting pod type vegetables which have been removed from the field attached to their vines the steps of: advancing a loose mass of vines, leaves and pods to a severing area, said area being of substantial width in a direction transverse to the direction of advance and said mass being advanced throughout the transverse extent of said area, grasping the vines and severing them and the leaves from the pods in said area, without substantial damage to the pods to the end that the vegetable within the pods is protected by the sealed condition of the pods, said grasping and severing actions being repeated rapidly and a multiplicity of times and said grasping actions being the primary force urging the material through said area to the end that the material flows through said area in an essentially continuous manner, said cutting area having open spaces of such extent that cut leaves and vines and including pods essentially free of leaves and vines may drop therethrough, and separating the pods in their original unopened state from the vines and leaves severed therefrom.

19. In a method of harvesting pod type vegetables in accordance with claim 18 wherein the plane of said cutting area rises in the direction in which the material is urged and the separating step is accomplished by directing a flow of air through the severed mass as it falls loosely and freely by gravity.

20. A method of harvesting pod type vegetables by and on a movable conveyance which advances through a field of the growing vegetable in a harvesting pattern which comprises the steps of: removing a swath of vines with the leaves and pods thereon from said field, conveying said removed material to a severing area, severing the vines by a multiplicity of successive and rapidly repeated severing actions while the material is fed through said area until the vines are in a relatively finely divided state and the pods are essentially free of leaves and vines with the pods for the most part being in a sealed condition with the vegetable protected therein, separating the pods from the leaves and vines and spreading the leaves and vines back on the field.

21. A method in accordance with claim 20 wherein the cutting area is of substantial width in a direction transverse to the direction in which the material if fed through said area and the material is conveyed to said cutting area throughout its transverse exent and in essentially the same condition of entanglement of the vines as existed in the growing field to the end that the material as it passes through the cutting area is relatively loose and unmatted.

22. A method in accordance with claim 20 wherein the cutting area is of substantial width in a direction transverse to the direction in which the material is fed through said area and in which the severed material is separated by directing a flow of air therethrough, the width of said swath and the width of said air stream being substantially coextensive with the width of said severing area to the end that the vines and leaves are spread back on the swath just previously removed substantially coextensive with the width thereof.

23. A method in accordance with claim 20 in which the material is conveyed to said severing area and fed therethrough in a direction opposite to the direction in which the conveyance is moved through the field and the separation is accomplished by directing a flow of air through the severed material in a manner such that the vines and leaves are spread back on the swath from which the material has just previously been removed.

24. A method of harvesting pod type vegetables by and on a movable conveyance which advances through a field of the growing vegetable in a harvesting pattern which comprises the steps of: removing a swath of vines with the leaves and pods thereon from said field, conveying said removed material in a rising plane to a severing area, said severing area being essentially planar and the plane thereof rising from a material entrance end to a material exit end, grasping and severing the vines without substantial damage to the pods by a multiplicity of successive grasping and severing actions, said severing actions being essentially continuous and the grasping actions being the primary force urging the material upward through said area to the end that the material flows through said area in an essentially continuous manner, said severing actions being carried out to an extent such that the vines are relatively finely divided and the pods are essentially free of vines and leaves with the pods sealed and the vegetable protected therein, directing a flow of air through the material after the material has been severed to separate the pods from the leaves and vines, the material as it is being severed moving in a direction opposite to the direction in which the conveyance is moving and the flow of air being directed so that the vines and leaves are spread back on the swath from which the material has been just previously removed.

References Cited in the file of this patent
UNITED STATES PATENTS

| | | |
|---|---|---|
| 1,352,197 | Johnson et al. | Sept. 7, 1920 |
| 1,873,681 | Urschel | Aug. 23, 1932 |
| 2,187,026 | Hamachek | Jan. 16, 1940 |
| 2,487,911 | Wehn | Nov. 15, 1949 |
| 2,550,129 | Urschel | Apr. 24, 1951 |
| 2,608,973 | Coons | Sept. 2, 1952 |